235-382 SR

11/6/84 XR 4,481,513

United States Patent [19]
Mole et al.

[11] Patent Number: 4,481,513
[45] Date of Patent: Nov. 6, 1984

[54] ELECTRONIC INDENTIFICATION SYSTEM

[76] Inventors: Alain M. Mole, 138 Avenue Ambroise Croizat, 38400 Saint Martin d'Heres; Jean-Louis P. J. Savoyet, La Mayrie, 38770 La Motte d'Aveillans, both of France

[21] Appl. No.: 377,311

[22] Filed: May 12, 1982

[30] Foreign Application Priority Data

May 12, 1981 [FR] France ................................ 81 09453

[51] Int. Cl.[3] ........................ H04Q 9/00; G08B 9/00; E05B 49/00

[52] U.S. Cl. ................................ 340/825.31; 235/382

[58] Field of Search ...................... 340/825.31, 825.54; 235/382; 361/172

[56] References Cited

U.S. PATENT DOCUMENTS 3,872,435 3/1975 Cestaro ....................... 340/147 MD
3,911,397 10/1975 Freeny, Jr. ..................... 340/825.31
3,944,976 3/1976 France. ............................ 340/146.2
4,031,434 6/1977 Perron et al. ....................... 361/172
4,353,064 10/1982 Stamm ........................... 340/825.31
4,396,914 8/1983 Aston ............................ 340/825.31

*Primary Examiner*—Donald J. Yusko
*Attorney, Agent, or Firm*—David B. Harrison

[57] ABSTRACT

The indentification system consists of a key comprising a passive memory area (10) and a shift register (9) and a lock which can be coupled with the key. The lock is capable of supplying a set number of pulses causing the code contained in the memory (10) to be loaded into the register (9). The register (9) is subdivided into a certain number of elements linked together but loaded independently. This loading is carried out successively by the multiplexer (111). Transmission of an incorrect number of loading pulses leads, through connection (113), to a modification of the contents of the shift register (9).

18 Claims, 7 Drawing Figures

ELECTRONIC INDENTIFICATION SYSTEM

This invention relates to a system for identifying a person for example with a view to operating an electrical, mechanical or other type of appliance. Systems of this type for identifying or recognizing persons have many applications. They are used in particular for opening doors, time control, running appliances used by several people like copying machines or, again, in systems for dispensing bank notes by credit cards.

In certain identification systems of conventional type, a movable part is used which comprises an identification code and which comes in the shape of a badge or of a credit card that the person to be identified carries around with them (see, for example, the U.S. Pat. No. 3,637,994). The identification code takes the material form either of perforations or of a magnetic band on the badge. The use of such badges has many drawbacks. Indeed they are relatively bulky and can be easily damaged. In the case of perforated badges the code is relatively easy to recognize. When the identification code medium is magnetic the magnetic band can be damaged by scoring or by the action of magnets. Furthermore, the appliance used to read badges of this type is necessarily complex and must, in particular, include a mechanical drive system enabling the badge to be moved for its identification code to be read. The result is that the reading appliances have a high construction cost.

In other identification systems a movable part is used in the form of an electronic key similar to a conventional key but comprising means for memorizing an identification code which can be detected and recognized by a reading system like a lock but consisting of a set of electronic circuits (see, for example, U.S. Pat. No. 4,038,637).

In French Patent No. 2 363 837 a system is used having a key with a programmable memory in which the identification code can be contained in a shift register housed in the electronic key. The data contained in the key can be read by the electronic lock by means of pulses supplied by a clock contained in the said lock. The data thus obtained are compared with a code stored in the key in such a manner as to determine the identicality of the two codes and control, for example, the opening of a latch or any other required operation.

In this system, however, there is a high risk of fraudulent duplication of the electronic key, the shift register of which enabling the identification code to be determined can be read relatively easily by a technician familiar with this type of device.

An object of the present invention is thus an identification system which does not have the shortcomings of the identification systems at present in use and known, one in which the movable part analagous to a key is inert, so that simply reading the shift register contained in the key does not allow the identification code to be determined in a simple manner. Another object of the invention is such a system in which the process of loading the identification code into the key's memory or the reading process lead to one or more modifications of the contents of this memory, thus making any fraudulent duplication extremely difficult.

The electronic identification system according to the invention comprises a movable part similar to an electronic key comprising a preprogrammed passive memory area connected to a memory which can be read and which may, for example, be a parallel-to-serial shift register. The system also comprises a fixed part similar to an electronic lock which can be coupled with the movable part and comprises electric power supply means, electronic means for supplying at least one pulse capable of initiating loading of the electronic identification code into the readable memory of the movable part, electronic means for reading the contents of the readable memory of the movable part and transferring it into a memory in the fixed part and means of comparison with a preprogrammed code in the said fixed part. According to the invention the electronic identification system also comprises electronic means in the fixed part for supplying a set number of loading pulses. The readable memory of the said movable part is subdivided into a certain number of elements which are connected together but loaded independently. Means are provided in the movable part for initiating the successive loading of each memory element following each of the set number of pulses transmitted by the electronic means of the fixed part. The movable part also comprises means for altering the contents of the readable memory when acted on by a pulse exceeding the number of memory elements.

In this way only the transmission of a set number preprogrammed in the lock's electronic means enables a code to be obtained in the movable part memory which is perfectly specified and which occurs in preprogrammed form in the fixed part of the electronic lock. If anyone tries to fraudulently copy the key of the identification system of the invention by using only too small a number of loading pulses, only part of the elements of the movable part memory will contain the electronic identification code bits so that the reading of the movable part memory contents will not correspond to the expected code.

On the other hand if a greater number of loading pulses than that enabling all the movable part memory elements to be loaded is sent, the contents of the said memory will get altered by the first pulse exceeding the set number, so that, here again, the contents of the movable part will no longer correspond to the right code.

In another embodiment it is possible, by initial programming, to find out the code modification caused by a number of loading pulses that exceeds by a specified amount the number of pulses leading to loading of all the movable part memory elements. Since this modified electronic code is preprogrammed into the fixed part comparison means, only transmission of the correct number of loading pulses permits a positive comparison which corresponds to the key of the system of the invention being enabled.

It can can therefore be seen that in all cases the system of the invention leads to very high security against any attempt at fraudulent duplication of the electronic key.

In a preferred embodiment of the invention the readable memory of the movable part comprises a parallel-to-series shift register, with the preprogrammed passive memory area in the movable part comprising a plurality of switches the position of which specifies the electronic identification code. It will be understood that these switches can be implemented simply by means of connections which may be fusible links, for example, some of which can be eliminated in the initial programming of the key. Each bistable of the movable part shift register is combined with one of the switches corresponding to one bit of the electronic code. The various bistables are grouped in register elements each corresponding to one or more bits of the above-mentioned code.

In a first embodiment of the invention the movable part comprises a counter combined with a multiplexer, the various outputs of which are connected to the various register elements corresponding to one or more bits of the above-mentioned electronic code. Another multiplexer output, the last for example, is connected to all the bistables of the movable part shift register in such a way as to cause the simultaneous shift of one bit of the data contained in the shift register when a signal is transmitted from the said output.

It can therefore be seen in this embodiment that transmission of one extra pulse compared with the number of pulses that is just required to load the whole of the electronic code into the various shift register elements produces, due to the shift of a bit, a modification of the code contained in the shift register, which therefore no longer corresponds to the right electronic code.

The above-mentioned output, the last multiplexer output for example, can also be connected directly to the first drive inputs imposing a particular state on the first shift register bistable. In this way the first bistable is driven into a different state from the one corresponding to a bit of the electronic code preprogrammed in the movable part.

The means for generating the loading pulses contained in the fixed part or electronic lock comprise a loading circuit which is advantageously provided with a master-slave type double bistable combined with a NAND gate receiving clock pulses and supplying loading pulses. The loading circuit output is connected to a loading modulation circuit provided with a counter combined with a monostable capable of acting on the loading circuit to cause it to stop after a set number of loading pulses.

The electronic means contained in the fixed part for reading the moving part shift register contents comprise a reading circuit which is advantageously provided with a master-slave type double bistable combined with a NAND gate receiving the above-mentioned clock pulses and connected to the output from the monostable of the loading modulation circuit. In this way the reading circuit is triggered after transmission of the set number of loading pulses and supplies successive pulses permitting serial reading of the data contained in the parallel-to-serial shift register of the movable part after this register has been loaded with the identification code and, if necessary, after a specific modification of the register contents through the action of a set number of loading pulses.

A read stop circuit allows the number of clock pulses to be limited to the exact number of bits contained in the movable part shift register. This read stop circuit advantageously contains a pulse counter receiving the read pulses from the read circuit and a monostable capable of delivering a read stop pulse when the number of pulses counted corresponds to the number of bits of the shift resister, i.e. when the contents of the movable part shift register have been read once.

In another embodiment of the invention the readable memory of the movable part is looped with itself. The means of reading the contents of the said memory are designed to transmit a set number of read pulses differing from a multiple of the number of bits of the said memory and each time leading to a permutation of its contents. A logic gate is also provided in order to only enable the transfer of the contents of the said movable part memory to the fixed part after transmission of the set number of the above-mentioned read pulses.

In this way, after loading by means of a set number of loading pulses as has just been stated, reading is no longer a matter of simply forwarding the contents of the movable part memory to the fixed part memory bit by bit by means of a number of read pulses exactly equal to the number of movable part memory bits. On the contrary, in this embodiment a number of permutations of the movable part memory contents is effected first of all before proceeding to read the contents of this memory.

In this way the security of the identification system of the invention is significantly further enhanced since only the electronic lock can know the result of this set number of permutations.

In one variant the movable part comprises a normally open logic gate receiving the successive read pulses transmitted by the read circuit of the fixed part and connected to the synchronization inputs or clock inputs of the flip-flops of the parallel-to-serial shift register of the movable part. The fixed part comprises another logic gate connected to the input of a serial-to-parallel shift register in the fixed part so that the read data is only passed after a set number of read pulses.

In another variant the movable part comprises control means for counting the set number of successive read pulses and a logic gate connected to the output of the parallel-to-serial shift register in the movable part and to the output of the above-mentioned control means so as to only allow transfer of the contents of the movable part register to the fixed part serial-to-parallel register after the above-mentioned set number of read pulses producing the permutation.

The control means may, for example, comprise a set of counters combined with one or more logic gates.

The memory area of the movable part preferably comprises a plurality of switches which may be made, for example, in the form of fusible links or by connections which may be destroyed and the position of which determines the electronic identification code. Each flip-flop in the movable part shift register is combined with one of the switches whose position controls its state via two NAND gates which receive the loading pulse on one of their inputs. The first of the above-mentioned NAND gates is connected via its other input to the switch with which it is associated. The second NAND gate receives the output from the first gate on its other input.

In this way, as soon as a loading pulse appears on one of the inputs of the two NAND gates each shift register flip-flop goes into a state corresponding to the state of the switch with which it is combined. The result is that the identification code initially represented by the position of the plurality of switches is transferred into the various shift register flip-flops.

In an advantageous embodiment the system may also comprise, in the fixed part, a successive tests enabling circuit. This circuit consists of a succession of flip-flops which are reset to zero in accordance with the positive result of the comparison carried out by the comparison means comparing with the preprogrammed code in the fixed part. In this way a number of unsuccessful tests is enabled which is equal to the number of flip-flops in this succession of flip-flops before an alarm is set off.

Suitable timing means may also be provided for resetting all the system's flip-flops to zero when the key is inserted and after uncoupling.

The invention will be more clearly understood on studying several embodiments taken as non-restrictive examples and illustrated by the appended drawings, in which.

Figure 6:
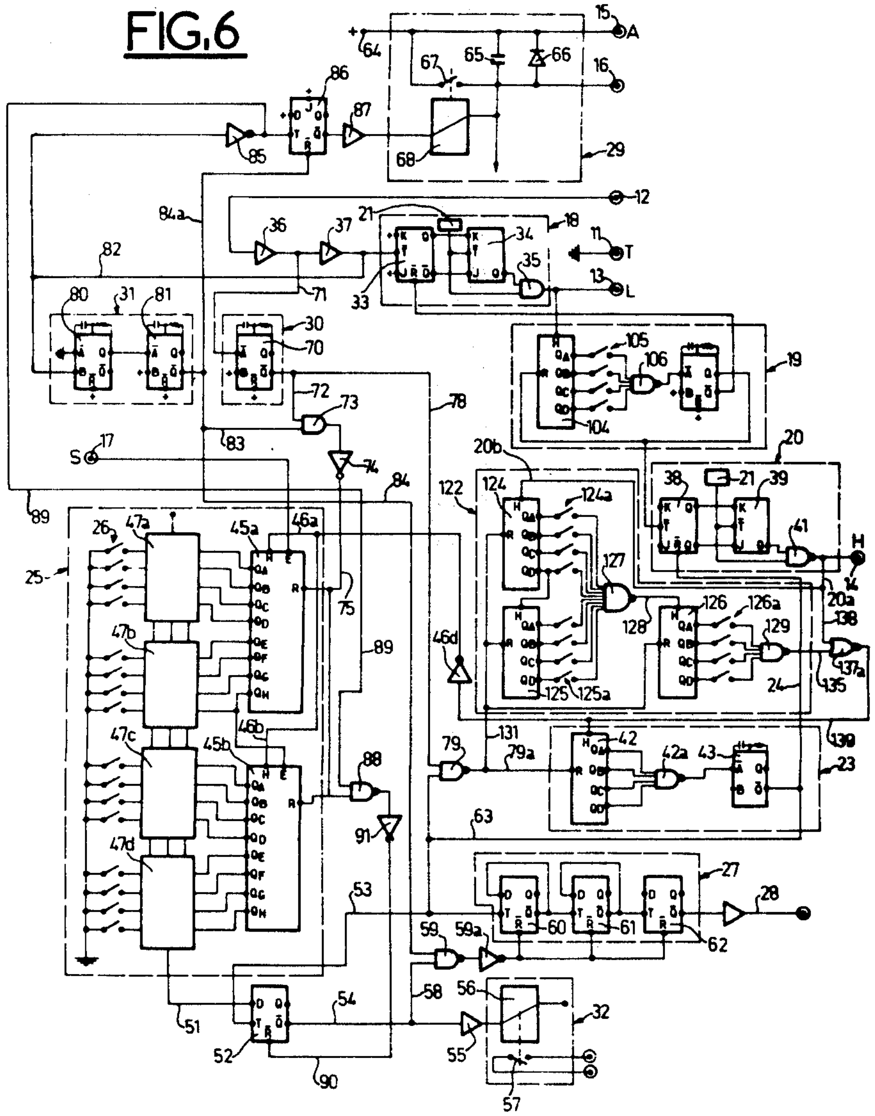
Figure 7:
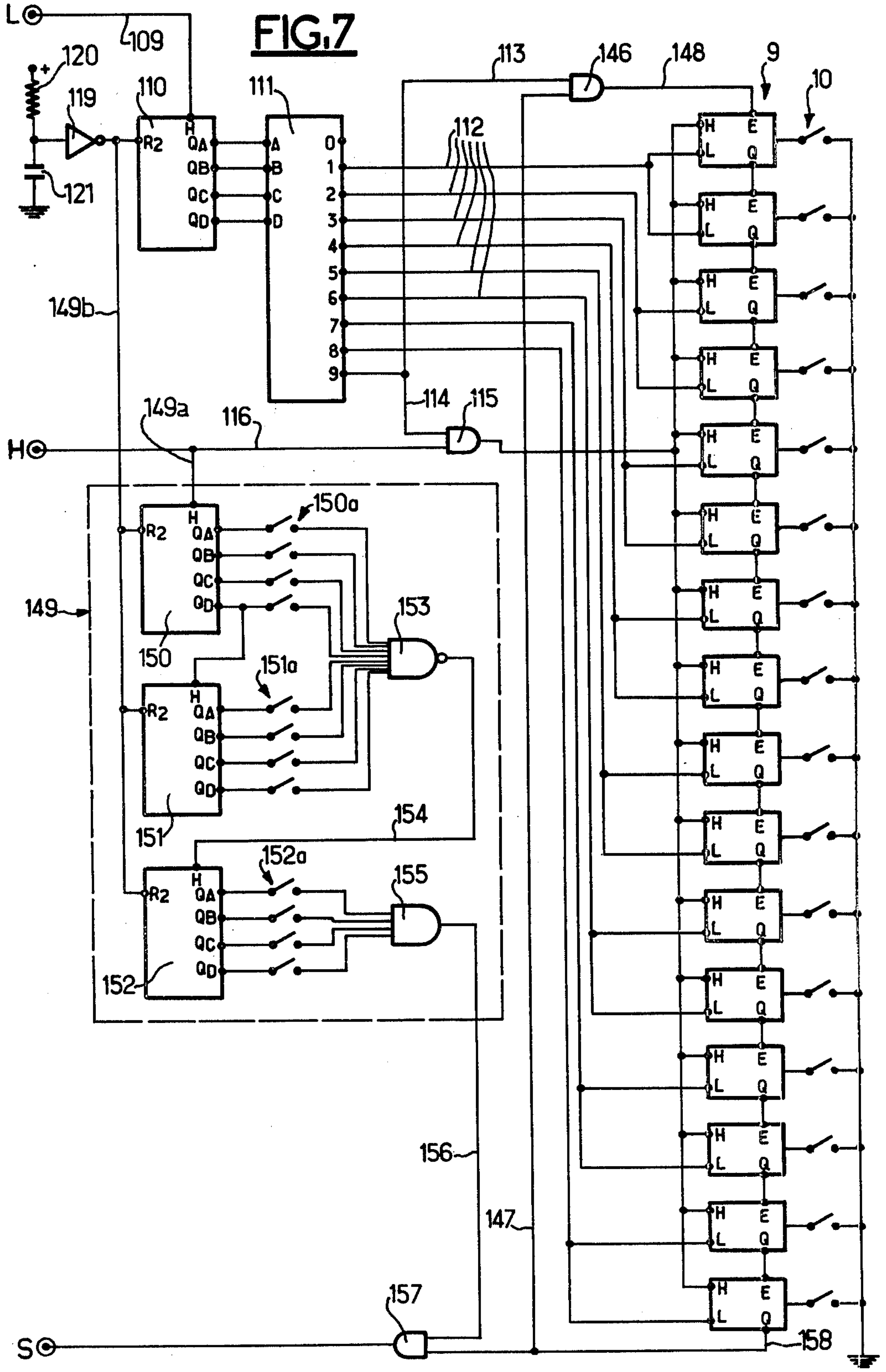

FIG. 6 again illustrates another variant of an electronic lock according to the invention; and FIG. 7 shows an electronic key designed to be coupled with the electronic key illustrated in FIG. 6.

So-called negative logic has been used in the illustrated examples, i.e. by convention level 1 has been adopted for the earth (ground) potential and level 0 for the supply voltage which is preferably very low and around +5 volts. The current demand remains limited to a few milliamperes to avoid any danger arising for the user.

Figure 1:
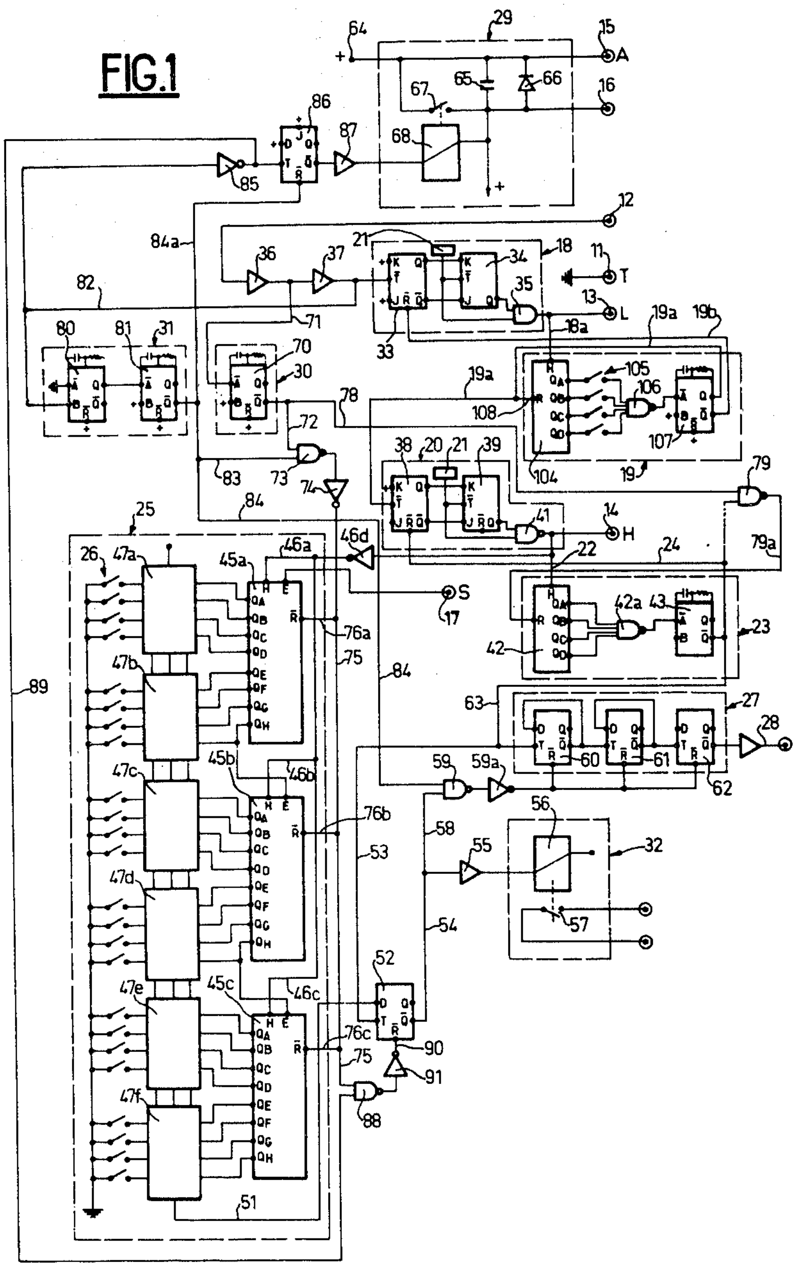
FIG. 1 shows schematically the main elements of the fixed part or electronic lock of an identification system according to the invention, designed to control a door latch.
Figure 2:
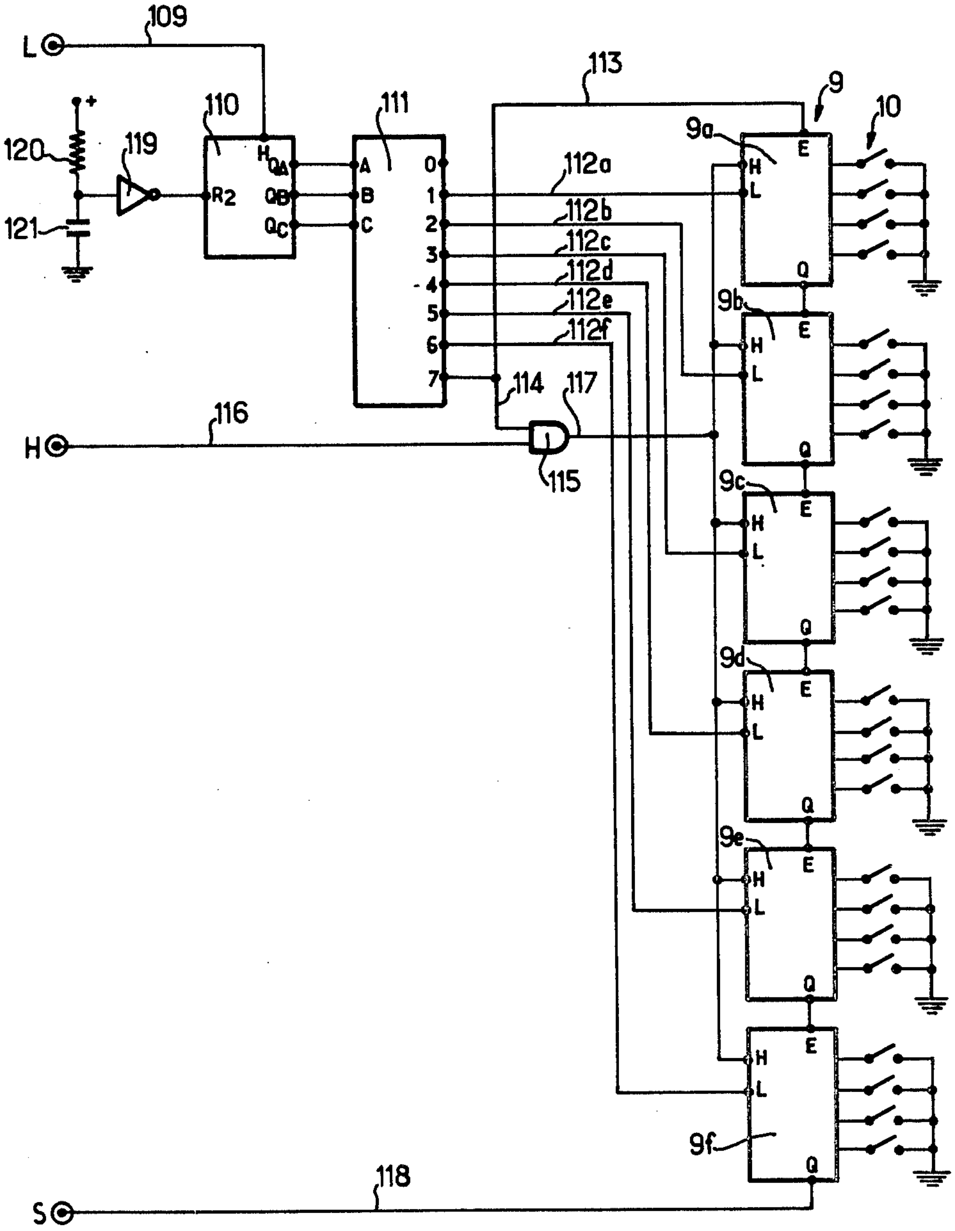
FIG. 2 shows schematically the movable part or electronic key designed to be coupled with the fixed part shown in FIG. 1.

As shown in FIGS. 1 and 2 in particular the identification system of the invention consists of a movable part which can be carried around, or electronic key, shown in FIG. 2 and a fixed part or electronic lock shown in FIG. 1. The movable part comes as a conventional key. It can advantageously be formed of a small fibre glass plate sandwiched between two thicknesses of hard plastics material with good resistance to solvents and extreme temperatures. The electronic key is therefore very strong and undergoes negligeable wear, particularly compared with a conventional type of badge.

The electronic key comprises a number of electrical contacts consisting of conducting elements buried in the plastics material engaging, on the fixed part side acting as the electronic lock, with steel balls held in place by springs not shown in the drawings. It is also possible to envisage making these contacts in some other way, for example by an opto-electronic connection.

It can be seen in FIG. 2 that the electronic key shown schematically comprises a parallel-to-serial shift register marked 9 overall driven by a succession of twenty-four switches 10 whose open or closed position defines the set of identification code bits. The switches 10 may, for example, consist of connections some of which have been initially destroyed so as to break the electronic connection between the two terminals. The key shown in FIG. 2 comprises a number of terminals designed to come into contact with the corresponding terminals of the electronic lock when the key is coupled with it. FIG. 2 shows only the main terminals of the key.

In FIG. 1 it can be seen that terminals 11 and 12 are connected together in the key by a connection not shown in the figure and are intended to be connected to the system earth (T). The L terminal marked 13 is designed to receive a train of pulses loading the code contained in the switch set 10 to the register 9. The H terminal marked 14 is designed to receive a train of pulses enabling the data contained in shift register 9 to be read. The A terminals marked 15 and 16 and connected together in the key by a connection which is not shown are designed to be connected to the electric power supply located in the lock. Finally the S output terminal marked 17 is connected to the Q output of shift register 9.

It will be noted at once that the electronic key is passive and contains no power supply source. Until the key is coupled to the lock, shift register 9 contains no data and reading it cannot therefore supply the identification code.

The electronic lock illustrated in FIG. 1 comprises a loading circuit marked 18 overall whose input is connected to terminal 12 when the key is coupled with the lock, i.e. with the system earth, and whose output supplies loading pulses to the L terminal.

The output of the loading circuit 18 is also joined via connection 18*a* to the input of a loading modulation circuit 19. An output from circuit 19 is connected via connection 19*a* to the input of a read circuit marked 20 as a whole and supplying a succession of clock pulses or read pulses on its H terminal. Another output from circuit 19 is joined via connection 19*b* to the loading circuit 18 in order to stop transmission of the loading pulses after a set number of pulses.

The read circuit 20 output is also linked via connection 22 to the input of a read stop circuit marked 23 overall whose output returns via connection 24 to the read circuit 20 in order to deliver a read stop pulse stopping the transmission of the clock pulses to the H terminal when the contents of the shift register 9 have been read once, i.e. when a total number of twenty-four pulses have arrived at the H terminal.

The S terminal connected to the Q output of shift register 9 receives the serial signal representing the data contained in shift register 9. The S terminal is connected to the E input of a circuit 25 performing a serial-to-parallel conversion and a comparison of the read data from the key with an identification code preprogrammed in the electronic lock itself and formed in the illustrated example by a set of preprogrammed switches 26.

In the illustrated example the electronic lock also comprises a successive tests enabling circuit 27 connected via an output connection 28 to an alarm device which is actuated after four fruitless tests in succession. A circuit 29 connected to the A terminals of the key enables the power supply to be stabilized at +5 volts.

A second resetting circuit 30 sets all the flip-flops and counters in the electronic key system to zero when the key is coupled with the lock.

A second zero resetting circuit 31 sets all the flip-flops and counters to zero and cuts off the power supply when the key is uncoupled.

Finally, a trigger control circuit 32 receives a signal when the comparison made in circuit 25 is positive.

A more detailed description of the various circuits just reviewed will now be given.

The loading circuit 18 comprises a master-slave double flip-flop consisting of a first flip-flop 33 or "master" and a second flip-flop 34 or "slave". The two flip-flops 33, 34 are connected together in the normal way, with the second flip-flop 34 receiving the clock signal from the clock circuit 21 on its $\overline{T}$ input. The Q output of flip-flop 34 is connected to one of the inputs of the NAND gate 35 which also receives the clock signal on its second input.

The $\overline{T}$ input of the first flip-flop 33 is connected via two timers 36 and 37 to the system earth via terminal 12 connected to the T terminal when the key is coupled with the lock. In these conditions therefore the system does operate in negative logic.

The read circuit 20 is of the same type as the loading circuit 18 and it comprises, like the latter, a master-slave double flip-flop 38, 39 mounted in the same way. The $\overline{T}$ input of the first flip-flop 38 receives an output pulse from the loading modulation circuit 19. The NAND gate 41 connected to the output of the second flip-flop 39 in the same way as the NAND gate 35 of the loading circuit 18 therefore supplies a succession of pulses to the H terminal; in the following description these pulses are called clock pulses or read pulses.

The output of the NAND gate 41 is connected via connection 22 to the read stop circuit 23 which comprises a counter 42 whose $Q_A$, $Q_B$, $Q_C$ and $Q_D$ outputs are connected to the input of a NAND gate 42*a*. The output from gate 42*a* is connected to the $\overline{A}$ input of a monostable 43.

The output pulses from NAND gate 41 or clock pulses arriving on the H terminal and transmitted via connection 22 to the H input of the counter 42 are counted until the number twenty-four is reached, corresponding in the illustrated example to the number of bits of the key shift register 9, i.e. to the number of switches 10. When this number has been reached the $\overline{Q}$ output of monostable 43 delivers an output signal applied via connection 24 to the drive input $\overline{R}$ of the first read circuit 20 flip-flop 38, resetting the latter to zero and thus stopping the clock pulses transmitted by circuit 20.

So by this means all the bits in the shift register 9 can be read off.

The serial signal arriving at the S terminal and representing the contents of register 9 feeds the E input of a serial-to-parallel converter comprising three serial-to-parallel shift registers 45*a*, 45*b* and 45*c* contained in the conversion and comparison circuit 25. In order to synchronize the serial-to-parallel conversion carried out in the three registers 45*a*, 45*b* and 45*c* with the reading of shift register 9, the clock pulses or read pulses are also applied via connections 46*a*, 46*b* and 46*c* as well as via inverter 46*d* to the H inputs of the three registers 45*a*, 45*b* and 45*c*. The comparison code preprogrammed in the fixed part or lock, materialized in the position of switches 26, is compared with the result of the serial-to-parallel conversion in the comparison circuit comprising the six comparators 47*a*, 47*b*, 47*c*, 47*d*, 47*e* and 47*f*, connected in series and connected both to the different parallel outputs of the three shift registers 45*a*, 45*b* and 45*c* and also to the different switches 26 grouped in fours for each of comparators 47*a* to 47*f*.

The result of the comparison leaving the last element 47*f* is a "zero" or "one" signal depending on whether the comparison is negative or positive. The result of this comparison arriving at connection 51 is applied to the D input of flip-flop 52 which also receives the output signal from the read stop circuit 23 on its T input via connection 53. When the comparison is positive a signal is transmitted by the $\overline{Q}$ output of flip-flop 52 and sent via connection 54 through amplifier 55 to the relay 56 closing the switch 57 of the latch control circuit 32.

At the same time the signal transmitted by the $\overline{Q}$ output of flip-flop 52 is sent via connection 58 to the NAND gate 59 whose output is connected via inverter 59*a* to the zero resetting drive inputs $\overline{R}$ of the three flip-flops 60, 61 and 62 of the successive tests enabling circuit 27 mounted in cascade and connected to the alarm control 28. The T input of the first flip-flop 60 receives the output signal from the read stop circuit 23 via connection 63.

If the comparison is negative a zero signal appears on the input to the monostable 52 so that the relay 56 is not energized and the latch is not opened. However a loading command acts on the T input of the first flip-flop 60 which moves forward one.

It can be seen that, by means of the cascade mounting of flip-flops 60, 61 and 62, four successive unsuccessful tests are enabled before the alarm 28 is set off by the successive tests enabling circuit 27. The power supply stabilization circuit 29 comprises an input terminal 64 connected to the power supply battery, supplying +5 V, for example contained in the electronic lock but not shown in the figure. The two terminals 15 and 16 designed to engage with the corresponding terminals of the key are connected together by capacitor 65 and diode 66.

When the key is coupled to the electronic lock the current flows between the two terminals 15 and 16. Switch 67 closes under the action of relay 68 so that the current virtually no longer flows through the key. Under these conditions the power supply to the electronic lock circuit as a whole is not disturbed, particularly if the key happens to vibrate.

The electronic lock also contains, in the first zero resetting circuit 30, a monostable 70 which receives the output signal from timer 36 on its $\overline{A}$ input via connection 71. Under these conditions the monostable 70 reacts to a signal having a falling edge on connection 71, i.e. when the key is coupled. The $\overline{Q}$ output of flip-flop 70 is connected via link 72 to one of the inputs of NAND gate 73. The output signal from NAND gate 73 permits the three registers 45*a*, 45*b* and 45*c* of the serial-to-parallel circuit 25 to be reset through their drive inputs $\overline{R}$ by means of inverter 74 and via connections 75, 76*a*, 76*b* and 76*c*. The $\overline{Q}$ output of flip-flop 70 is additionally linked via connection 78 to one of the inputs of NAND gate 79 which receives on its other input the output signal from the read stop circuit 23. The output from NAND gate 79 resets counter 42 to zero via connection 79*a*.

Circuit 31 for resetting to zero when reading is completed and the key removed comprises two monostables 80 and 81 cascade mounted, with the Q output of monostable 80 being connected to the $\overline{A}$ input of monostable 81. The first monostable 80 receives the output signal from timer 37 on its B input via connection 82 and, because of this arrangement, reacts to a signal having a rising edge on connection 82, i.e. when the key is being uncoupled. The $\overline{Q}$ output of the second monostable 81 which supplies a very short pulse is connected via connection 83 to the second input of NAND gate 73 which leads, as was seen previously, to zero resetting of the serial-to-parallel conversion circuit 25. The $\overline{Q}$ output of monostable 81 is also connected via connection 84 to one of the inputs of NAND gate 59 in such a way as to reset to zero the flip-flops 60, 61 and 62 of the successive tests enabling circuit 27 when the key is uncoupled.

When the key is being uncoupled the rising edge signal on connection 82 at the output of timer 37 applied via inverter 85 to the T input of flip-flop 86 triggers, by means of amplifier 87 connected to its $\overline{Q}$ output, relay 68 of the power supply circuit 29 so that the power supply is cut off. Flip-flop 86 is reset by its $\overline{R}$ input via connection 84*a* connected to the $\overline{Q}$ output of monostable 81 when the key is uncoupled from the lock.

It will also be noted that NAND gate 88 receives on its two inputs respectively the output signal from NAND gate 73 via inverter 74 and connection 75 and the output signal from inverter 85 via connection 89. The output signal from NAND gate 88 enables flip-flop 52 to be reset to zero through its $\overline{R}$ input by means of connection 90 and inverter 91, when the key is being uncoupled after the time delay of timer 37 has expired.

Figure 3:
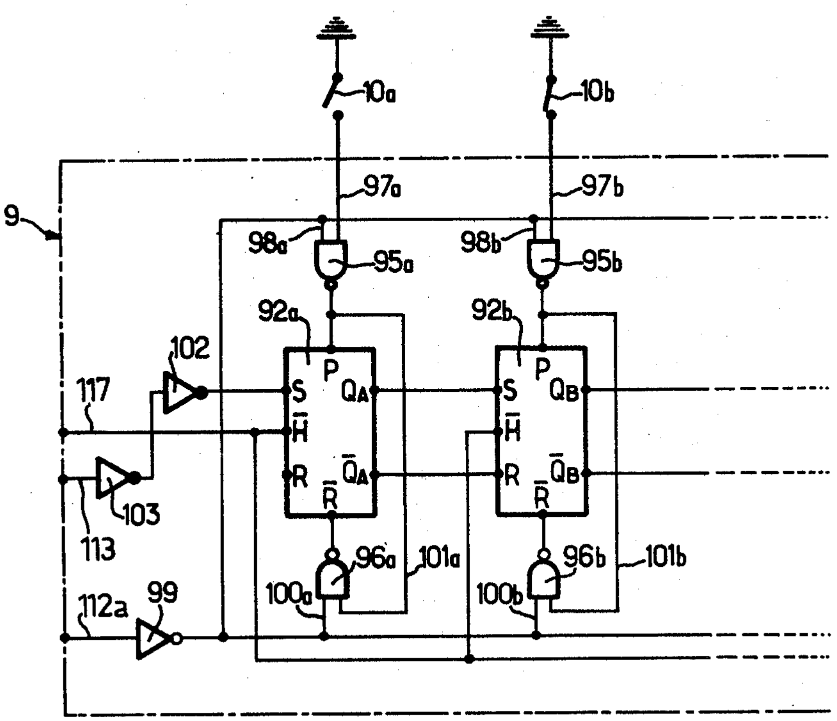
FIG. 3 is a detailed part view of the shift register of the movable part shown in FIG. 2 showing the identification code loading control circuit.

The detailed structure of the shift register 9 in the key and of the set of switches 10 acting as the preprogrammed memory is illustrated in part in FIG. 3. Switch 10*a* is shown open which, in the negative logic chosen as an example for the circuit in FIG. 2, corresponds to a "one" signal. Switch 10*b* connected to earth is shown closed, which corresponds to a "zero" signal. The other switches have not been shown in FIG. 3. In this figure we also find the first two flip-flops 92*a* and 92*b* corresponding to the first two bits of the shift register 9 which receive on their $\overline{H}$ inputs the clock signals or read pulses from the lock's reading circuit 20 via connection 117 illustratei also in FIG. 2. The various flip-flops 92*a*, 92*b*, etc. are connected together in cascade in the conventional way, with the Q and $\overline{Q}$ outputs of each upstream flip-flop being connected to the S and R inputs of the next flip-flop down in such a manner as to obtain shift register 9.

Two NAND gates 95*a* and 96*a* are combined with flip-flop 92*a*, with the outputs of the two NAND gates being connected respectively to the P input putting flip-flop 92*a* in the "one" state and to the $\overline{R}$ input putting flip-flop 92*a* in the "zero" state.

The first NAND gate 95*a* is connected via its first input through connection 97*a* to switch 10*a* and via its second input through connection 98*a* to the output of inverter 99 receiving the loading pulse corresponding to the register element 9*a* through connection 112*a* which can also be seen in FIG. 2.

The output of inverter 99 is also connected via connection 100*a* to one of the inputs of NAND gate 96*a* which receives the output from NAND gate 95*a* on its other input via connection 101*a*.

The same elements with the suffix "b" are combined with flip-flop 92*b* and with switch 10*b*. The same elements also occur for each following flip-flop corresponding to each bit of shift register 9. The different elements 9*a* to 9*f* have a similar structure and are assembled as illustrated in FIG. 2.

In the case of switch 10*a* a "one" signal is applied to input 97*a* of NAND gate 95*a*. Owing to the presence of inverter 99 the negative loading pulse leads to the presence of a "one" signal on the second input 98*a* which leads to a "zero" signal on the output of NAND gate 95*a*. This "zero" signal applied to input 101*a* of the second NAND gate 96*a*, which receives a "one" signal on its other input, causes a "one" signal to appear on the resetting input $\overline{R}$ of flip-flop 92*a*. Inspection of the circuit associated with flip-flop 92*b* shows that the closed position of switch 10*b* leads to an opposite state for flip-flop 92*b* to the state for flip-flop 92*a*. In these circumstances the arrival of a loading pulse on connection 112*a* means that four bits of the identification code materialized in the position of the first four switches 10 are transferred in the form of the state of the various flip-flops 92*a* to 92*d* which can then be read serially by the clock signals applied to the $\overline{H}$ inputs. If there is no loading pulse all the flip-flops stay in the zero state in the example illustrated.

The drive inputs S and R of the first flip-flop 92*a* are also connected through inverters 102 and 103 to connection 113 which can also be seen in FIG. 2.

If reference is again made to FIG. 1 it can be seen that the loading modulation circuit 19 comprises a counter 104 receiving on its H input the loading pulses transmitted by the loading circuit 18 and connected by its outputs $Q_A$, $Q_B$, $Q_C$ and $Q_D$ to a group of four switches 105 connected to the four inputs of a NAND gate 106. The output from gate 106 is connected to the $\overline{A}$ input of monostable 107 the Q output of which is linked via connection 19*a* to the input of the read circuit 20. The $\overline{Q}$ output of monostable 107 is connected through connection 19*b* to the resetting input $\overline{R}$ of the first flip-flop 33 of the loading circuit 18. Counter 104 is reset to zero by the output signal transmitted by the Q output of monostable 107 by means of connection 108.

If reference is now made to FIG. 2 it can be seen that the loading pulses arriving on the L terminal and coming from the loading circuit 18 are sent, when the key is coupled to the lock, through connection 109 to the H input of a counter 110 the $Q_A$, $Q_B$ and $Q_C$ outputs of which are connected to the A, B and C inputs of a multiplexer 111.

The shift register 9 is subdivided into six elements 9*a*, 9*b*, 9*c*, 9*d*, 9*e* and 9*f*. Each of elements 9*a* to 9*f* is shown schematically in FIG. 2 and actually consists of six sets of flip-flops and NAND gates like those shown in FIG. 3; each of these flip-flops works in conjunction with one of the switches 10. In these circumstances each of the elements of the shift register 9 works in conjunction with four switches 10.

The loading inputs, marked L, of each of elements 9*a* to 9*f* are linked respectively to the outputs numbered from 1 to 6 of the multiplexer 111 via connections 112*a* to 112*f*.

In other words an output signal on one of the outputs of the multiplexer 111 leads to one single element of the shift register 9 being loaded, i.e. four identification code bits represented by the position of the set of switches 10.

Output number 7 from multiplexer 111 is connected via connection 113 to the E drive input of the first element 9*a* of the shift register 9 as illustrated in detail in FIG. 3. Furthermore the output signal transmitted by output number 7 of the multiplexer 111 is also sent via connection 114 to one of the inputs of AND gate 115 whose other input is connected via connection 116 to the H terminal receiving the clock pulses or read pulses transmitted by the lock's reading circuit 20. The output from the AND gate 115 is linked via connection 117 to all the clock inputs H of the various elements of the shift register 9, with these inputs being connected to the $\overline{H}$ inputs of all the flip-flops 92 as illustrated in FIG. 3.

The Q output from the last element 9*f* is connected via connection 118 to the output terminal S.

Counter 110 is reset when the key is being removed by means of inverter 119 connected to the power supply through resistor 120 and capacitor 121 and forming a Schmitt trigger.

The system illustrated works as follows. When the key is inserted into the electronic lock power is switched on to the whole system, with the two terminals 15 and 16 being short-circuited. The clock circuit 21 located in the lock transmits successive pulses. After a certain time set by the timer 36 a falling edge signal provides, through monostable 70, a pulse which sets the various lock elements to zero. The output from the second timer 37 transmits a falling edge signal which leads, after a second time delay, to the loading circuit 18 initiating transmission of negative loading pulses. These pulses arrive on the input of counter 110 in the key causing, in succession, the transmission of a negative pulse on the various outputs of the multiplexer 111 leading to loading of the different elements 9*a* to 9*f* of the shift register 9, which each time receive an item of data corresponding to the position of the four switches 10, i.e. to four bits of the electronic identification code preprogrammed in the key. It should be noted that, for simplicity's sake, in FIG. 2 all the switches 10 have been shown in the open position. Of course some of these switches are in the closed position in actual fact, thus defining a code that has been initially preprogrammed into the key.

The loading pulses transmitted by circuit 18 are also applied to the input of counter 104 located in the lock's loading modulation circuit 19. It is therefore possible to produce transmission of a set number of loading pulses depending on the preset position of switches 105. Thus, as soon as this number, which is set by the position of the various switches 105, has been reached, a signal is transmitted by NAND gate 106 and by monostable 107 which leads to shutdown of the loading circuit through connection 19*b*.

According to a first embodiment the various switches 105 can be positioned so that the number of loading pulses transmitted by circuit 18 is six. In these circumstances the six loading pulses enable all the twenty-four switches 10 grouped in fours to be effectively loaded.

When a fraudulent attempt at copying is made by reading the key, the transmission of a greater number of loading pulses than six causes the contents of shift register 9 to be altered. Thus, if a seventh pulse arrives on output number 7 of the multiplexer 111 it causes the contents of shift register 9 to be shifted by one bit, via connection 113. It will be noted that for seven pulses the logic gate 115 is blocked by the "zero" signal arriving on output number 7 owing to the use of negative logic, so that the signal coming from the H terminal cannot get through gate 115 which prevents the contents of shift register 9 from being read at all.

If an eighth loading pulse is transmitted a "zero" pulse again arrives at the output of multiplexer 111 numbered one. Owing to the shift produced by the seventh pulse the contents of shift register 9 no longer correspond to the identification code initially materialized by switches 10.

In another embodiment it is possible to program the number of loading pulses in an initially predetermined way by positioning the switches 105 of the loading modulation circuit 19 differently. If the number of loading pulses is known, it is easy to work out from it the modification made to the contents of shift register 9 by the various pulses appearing cyclically on output number 7 of the multiplexer 111. If the code thus modified is known it is possible to take it into account in the code preprogrammed into the lock which is materialized by the various switches 26.

It can be seen that, in any case, the subdivision of the shift register 9 into several elements combined with connection 113 to multiplexer 111 output number 7 allows the preprogrammed code to be altered in accordance with the number of loading pulses transmitted by the lock's loading circuit 18. This results in very great security making it virtually impossible to fraudulently copy the key in any way.

After the preset number of loading pulses has been transmitted, and the shift register contains either the initial identification code or a code modified in a predetermined manner, the output signal from the loading modulation circuit 19 coming from the Q and $\overline{Q}$ outputs of monostable 107 leads both to the cessation of the loading pulses and to initiation of transmission of clock pulses or read pulses by the reading circuit 20. These pulses appear on the H terminal and, through AND gate 115, allow the contents of the various elements 9*a* to 9*f* of the key's parallel-to-serial shift register 9 to be read serially. The read pulses are counted by the read stop circuit 23 so as to be equal in the illustrated example to twenty-four, i.e. to the number of bits in shift register 9.

The serial signal arriving on the S terminal and applied to serial-to-parallel shift registers 45*a* to 45*c* is compared in comparators 47*a* to 47*f* with the preprogrammed code materialized by switches 26.

It will be noted that, for simplicity's sake, the various switches 26 have all been shown in FIG. 1 in the open position. Of course, in actual fact, some of these switches 26 are in the closed position.

When the comparison made is positive an output signal consisting of a rising edge appears on comparator 47*f*. A negative pulse is supplied by flip-flop 52 which enables the latch 32 to be fed by means of a falling edge signal.

Figure 4:
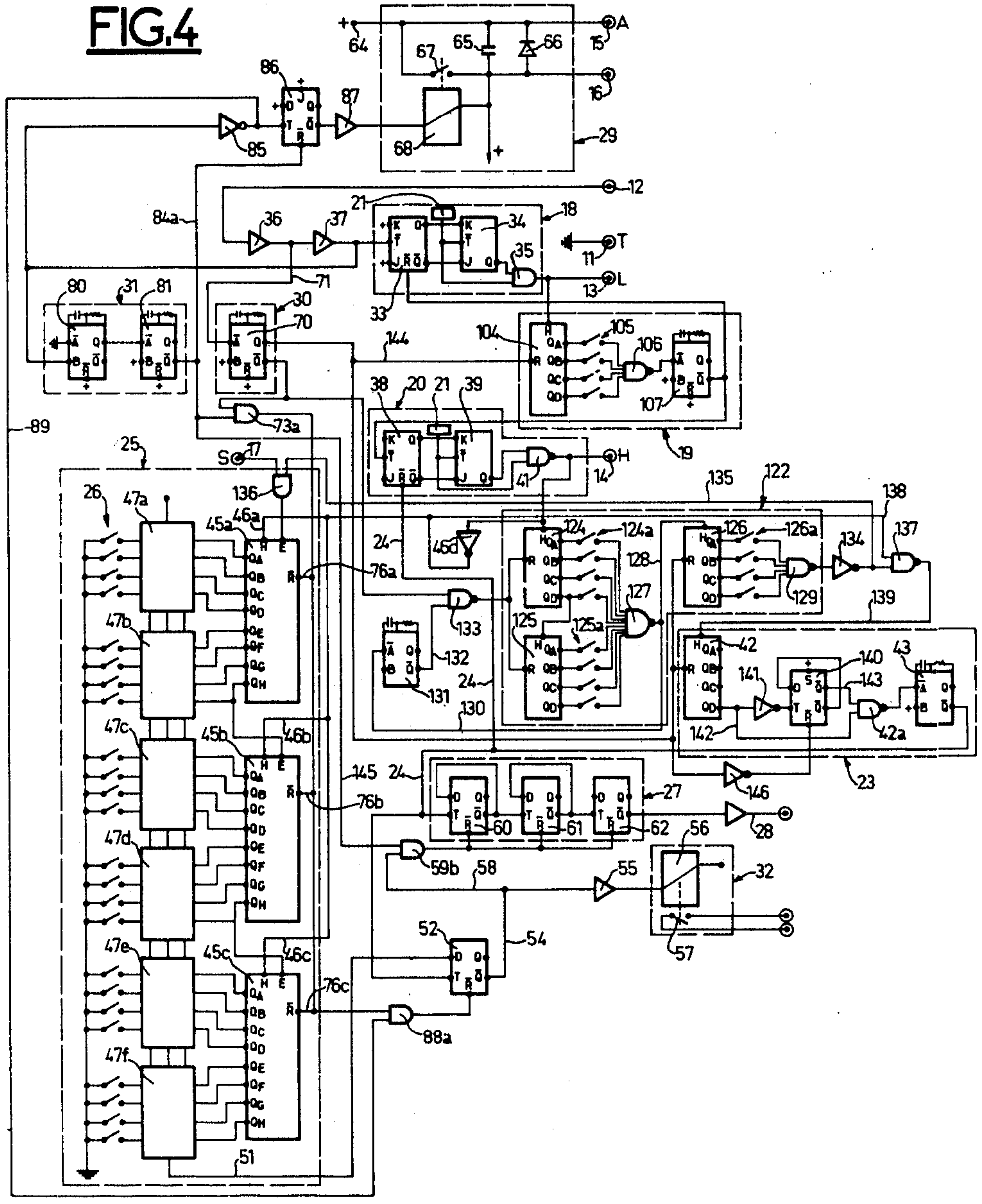
FIG. 4 is a similar schematic to FIG. 1 showing a variant of an electronic lock according to the invention.
Figure 5:
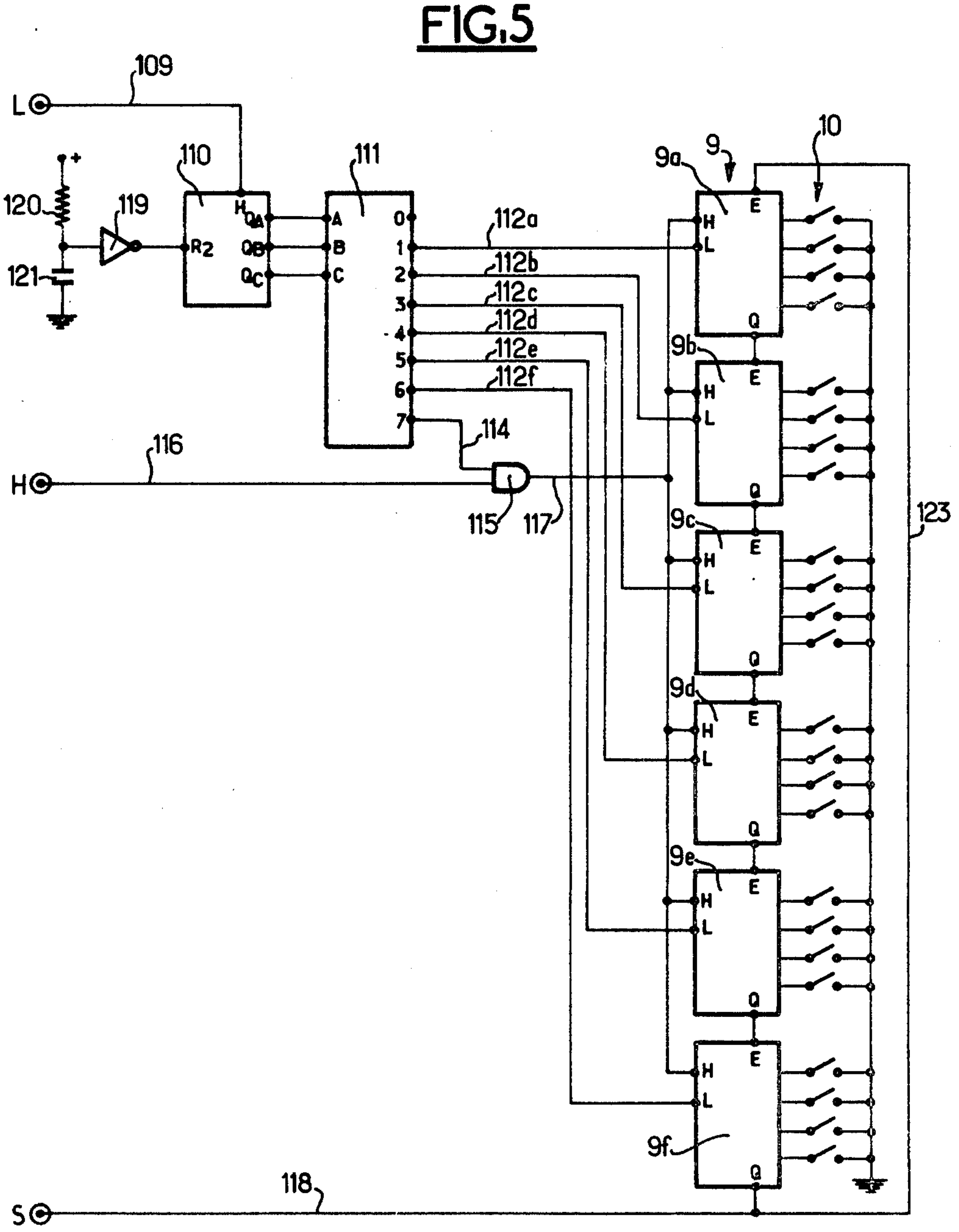
FIG. 5 shows an electronic key designed to be coupled with the electronic lock in FIG. 4.

The embodiment illustrated in FIGS. 4 and 5 repeats the main elements in the embodiment illustrated in the previous figures and these corresponding elements are labelled with the same reference numbers. However, in this embodiment, the fixed part or electronic lock also comprises a clock modulation circuit 122 and the shift register in the movable part or electronic key illustrated in FIG. 5 is looped back on itself, with the Q output of the last element 9*f* being connected via connection 123 to the drive input E of the first element 9*a*. The clock modulation circuit 122 comprises a set of three counters 124, 125 and 126. The first counter 124 receives the clock pulses or read pulses transmitted by the read circuit 20, on its H input. Four switches 124*a*, which can be preprogrammed, define, by their positions, a specific number and are connected to the $Q_A$, $Q_B$, $Q_C$ and $Q_D$ outputs of counter 124. On its H input the second counter 125 receives the $Q_D$ output from the first counter 124. It is also combined with four switches 125*a* the position of which also defines a specific number and which are connected to the $Q_A$, $Q_B$, $Q_C$ and $Q_D$ outputs of counter 125. A NAND gate 127 receives all the connections from the eight switches 124*a* and 125*a* on its various inputs. The output from gate 127 is connected via connection 128 to the input of the third counter 126 which is also combined with four switches 126*a* and the same is true for both counters 124 and 125. The connections of the four switches 126*a* are linked to the inputs of a NAND gate 129.

The arrangement of these various means means that the output from gate 129 transmits a signal after transmission of a number of clock pulses or read pulses by circuit 20 which depends on the position of the various switches 124*a*, 125*a* and 126*a*. The number defined by the first two counters 124 and 125 corresponds to the number of read pulses within a cycle. The number defined by counter 126 corresponds to the number of cycles. The total number defined by the modulation circuit 122 as a whole is the product of these two numbers. Of course other means could be used for this counting operation. It will be noted that the output of NAND gate 127 is also connected via connection 130 to the $\overline{A}$ input of monostable 131 whose $\overline{Q}$ output is linked via connection 132 to one of the inputs of NAND gate 133 thus resetting counters 124 and 125 to zero through their R inputs when a signal is transmitted by the NAND gate 127. Thus the first two counters 124 and 125 are reset to zero after each of the cycles counted by the third counter 126.

When the number of read pulses thus determined has been transmitted by the read circuit 20, the output signal from the NAND gate 129 transmitted through inverter 134 arrives via connection 135 at the first input of the AND gate 136, whose second input is connected to the E input terminal which receives the output signal from the key's register 9. In this way the contents of the said register cannot be introduced into the comparison circuit 25 until the number of read pulses imposed by the clock modulation circuit 122 has been transmitted.

The output from NAND gate 129 is also connected to one of the inputs of a NAND gate 137 which receives, on its second input via connection 138, the clock pulses transmitted by the reading circuit 20.

In other words, after a preset number of permutations performed by the clock pulses the number of which is set by the three counters 124, 125 and 126, new read pulses, still transmitted by the reading circuit 20 through NAND gate 137, are sent via connection 139 to the input of read stop circuit 23. These pulses are counted as in the preceding embodiment. The means employed are slightly different to the extent that counter 42 is here combined with a flip-flop 40 connected via its T input to the $Q_D$ output of counter 42 through inverter 141. The two inputs of NAND gate 42*a* are connected respectively to the $Q_D$ output of counter 42 via connection 142 and to the Q output of flip-flop 140 via connection 143. The output from NAND gate 42*a* is connected to the $\overline{A}$ input of monostable 43 which leads, as before, to the transmission of a signal stopping the reading circuit 20 through connection 24.

It will also be noted that, in this embodiment and as a variant, certain elements have been modified slightly. Thus the NAND gate 73 combined with inverter 74 in the embodiment in FIG. 1 has been replaced by the single AND gate 73*a*. The same is true for AND gates 59*b* and 88*a* in FIG. 4 which replace NAND gates 59 and 88 combined with inverters 59*a* and 91 in the embodiment in FIG. 1. Operation is strictly identical, of course.

The identification system illustrated in FIGS. 4 and 5 works as follows. The identification code materialized by the position of the various switches 10 in the key's shift register 9 is loaded as in the preceding embodiment by means of a preset number of loading pulses transmitted by the loading circuit 18, the number of which is determined by the loading modulation circuit 19 and which are sent through the multiplexer 111 to the various elements 9*a* and 9*f* of register 9. It will, however, be noted that, in the circuit illustrated in FIG. 5, no connection is provided between output number 7 of the multiplexer 111 and the E input of shift register 9. Thus, in this embodiment, the identification code contained in the shift register 9 when a signal is transmitted at output number 7 of the multiplexer 111 is modified only through the AND gate 115 whose output is connected via connection 117 to the various clock inputs H of the shift register 9 looped back on itself. This one-bit shift leads to a permutation of the contents of shift register 9.

As in the preceding embodiment the code contained in the shift register is thus modified according to the number of loading pulses.

After the right number of loading pulses has been transmitted the lock's reading circuit 20 is started up and a number of clock pulses determined by the three counters 124, 125 and 126 is sent to the H terminal. Each of these pulses causes one permutation of the contents of the key's shift register 9 through AND gate 115. It should be noted that during these various permutations the signal arriving at the S terminal is not introduced into the comparison circuit 25 owing to the existence of AND gate 136 which blocks its input so long as no signal is transmitted on the output of NAND gate 129. When this permutation phase is completed the AND gate 136 receiving the signal from the NAND gate 129, lets through a number of read pulses equal to the number of bits in shift register 9 so that its contents can be read off. This number is set by the read stop circuit 23 as in the previous case.

The comparison is performed with respect to a predetermined state of the various lock switches 26. The lock alone is capable of knowing the code modifier after the successive permutations caused by the clock modulation circuit 122.

It will be noted that in the embodiment in FIG. 4 the counter 104 of the loading modulation circuit 19 is reset to zero directly through connection 144 connected to the Q output of monostable 70. Similarly it is here the Q output of monostable 70 which, through connection 144, resets counter 126 and counter 42 and, through inverter 146, flip-flop 140 all to zero at the beginning of operation.

It may turn out to be worthwhile providing for means of checking the number of clock pulses in the key itself. The embodiment in FIGS. 6 and 7 illustrates this possibility for the case of a sixteen-bit code.

In FIGS. 6 and 7 we again find the main elements already described in connection with the preceding figures, and thus marked with the same reference numbers In particular in FIG. 6 we find the loading modulation circuit 19 which is here connected in the same way as in FIG. 1, along with the clock modulation circuit 122. As a variant NAND gate 137 associated with inverter 134 illustrated in FIG. 4 have here been replaced by the NOR gate 137*a* which plays the same role.

In the key embodiment illustrated in FIG. 7 sixteen flip-flops have been shown forming the shift register 9, with each of these flip-flops being combined with one of the switches 10. In this embodiment the multiplexer 111 comprises eight outputs each linked to a pair of flip-flops of the register 9 by their L inputs via the various connections 112. The last output, numbered 9, is linked to all the H inputs of the various flip-flops via connection 114 and the AND gate 115 which receives the clock or read pulses from the H terminal on its second input via connection 116.

Output number 9 of multiplexer 111 is further linked via connection 113 to one of the inputs of an AND gate 146 the other input of which is connected by connection 147 to the Q output of shift register 9. The output of the AND gate 146 is connected via connection 148 to the drive input E of the first flip-flop of the shift register 9.

The key additionally comprises a circuit checking the number of clock pulses similar to the lock's clock modulation circuit 122. This control circuit 149 consists of three counters 150, 151 and 152. The first two counters 150 and 151 each associated with four programming switches 150a and 151a, feed a NAND gate 153 which is connected at its output via connection 154 to the input of the third counter 152. This is combined with four programming switches 152a connected to the four inputs of an AND gate 155. The output from AND gate 155 is linked via connection 156 to one of the inputs of an AND gate 157 the second input of which is connected by connection 158 to the Q output of shift register 9. The output from AND gate 157 is connected to the S output terminal.

The system illustrated in FIGS. 6 and 7 works in the following manner. After the operation of coupling the key and the lock, loading is carried out as before, for example according to the embodiment illustrated in FIGS. 1 and 2. Here it is a good idea for the loading circuit 18 to transmit a number of at least one loading pulse so that all the flip-flops in the key's shift register 9 are loaded with the data contained in the switches 10. If this exact number of loading pulses is transmitted the AND gate 115 stays open, so that the read or clock pulses from the H terminal can pass through this gate and shift the data contained in register 9 by acting on the various H inputs of the flip-flops.

On the other hand, transmission of an additional loading pulse leading to a signal on output number 9 on the multiplexer 111 in FIG. 7 causes, through AND gate 146, a permutation of the data contained in register 9 whose input is looped with its output through connection 147.

As before, it is possible as a variant to send a higher number of loading pulses by suitably programming the lock's loading modulation circuit 19, which alone can know the modification in the contents of register 9 which will result from this.

When a precise number of loading pulses has thus been transmitted, a number of clock pulses which is also determined by the clock modulation circuit 122 arrive at the H terminal. The key's control circuit 149 receives these pulses via connection 149 and counts their number; in this respect it should be noted that the programming of the control circuit 149 by means of the three sets of switches 150a, 151a and 152a is of course the same as that of the lock's clock modulation circuit 122 depending on the position of the three groups of switches 124a, 125a and 126a.

The two counters 150 and 151 in the control circuit 149 play the same part as the two counters 124 and 125 of the clock modulation circuit 122 and count the number of clock pulses in a cycle. The third counter 152 of the control circuit 149 play the same role as the third counter 126 of the clock modulation circuit 122 and counts the number of cycles. Each clock pulse transmitted by AND gate 115, which is open since there is no signal on output number 9 of the multiplexer 111, produces a shift of one bit in the contents of shift registor 9 and a permutation of these contents owing to the loop via connection 147. So long as no signal arrives at the output of AND gate 155, AND gate 157 stays blocked so that the data contained in shift register 9 is no longer sent to the S terminal and to the lock's comparison circuit 25.

When the set number of clock pulses has been transmitted by the clock modulation circuit 122 and checked by the control circuit 149, another train of clock pulses or read pulses arrives at the H terminal, with the number being counted by the lock's read stop circuit. In this position a signal remains transmitted by AND gate 155 so that AND gate 157 is open. The contents of shift register 9 are therefore transferred serially via terminal S to the lock's comparison circuit 25. When the key is being uncoupled the three counters 150, 151 and 152 are reset to zero by the Schmitt trigger 119 connected to the above-mentioned counters through connection 149b.

It should be noted that in order to get a suitable modification of the contents of the shift register 9 it is necessary for the number of clock pulses counted by the clock modulation circuit 122 and checked by the control circuit 149 not to be a multiple of the number of bits in the shift register 9. If this were not the case it is easy to see that permutation would produce no modification in the contents of shift register 9.

In a first variant the number of pulses determined by the first two counters 124 and 125 in circuit 22 and checked by the first two counters 150 and 151 of the control circuit 149 exceeds the number of bits of the shift register 9. Thus the read pulses arriving on terminal H after the various permutations effectively enable the whole of the contents of the shift register 9 to be read without gate 157 being blocked by the lack of a signal on AND gate 155.

In another variant it is, on the other hand, possible to cause the third counter 152 to be set back to zero after the cycle number determined by switches 152a has been counted and to enable one bit of shift register 9 to leave gate 157 each time a number of clock pulses equal to the number laid down by the three counters 150, 151 and 152 appears on the H terminal. In this variant it is therefore necessary to read the whole of the contents of shift register 9 to produce as many permutations by the clock modulation circuit 122 as there are bits in the register 9 in order to read the whole of the contents of this register.

To sum up, it can be seen that the system described makes it possible to obtain a complex modification of the contents of shift register 9 so that any fraudulent copying of the key is made extremely difficult.

In this description the possibility of modifying the codes by blowing fuses has been mentioned. It will be understood that it would also be possible to alter the codes by using an EEPROM technology, i.e. by means of memories which can be reprogrammed several times and thus produce a reversible change of state. In this case it also becomes possible to extend the application of the invention by planning for a first part of the code, 24 bits for example, to be fixed, its security being guaranteed by the means of the invention, whilst a second part of the code, 48 bits for example, can be modified as required and several times in order, for example, to manage funds.

We claim:

1. An electronic identification system, comprising a moveable part containing a readable memory and a preprogrammed passive memory area containing an electronic identification code, connected to said readable memory and a fixed part capable of being coupled with the moveable part and comprising electric power supply means, loading electronic means for supplying at least one pulse causing the electronic identification code to be loaded into the readable memory of the said moveable part, reading electronic means for reading the contents of the readable memory of the moveable part and transferring said contents into a second memory in the fixed part and comparison means for comparing said contents with a code preprogrammed into the said fixed part, characterized in that said reading electronic means supplies a set number of loading pulses to said moveable part, with the readable memory of the moveable part being subdivided into a certain number of elements connected together but loaded independently, and further comprising loading control means in the moveable part for producing the successive loading of each memory element following each of a set number of pulses and permutation means in the movable part for modifying the contents of the readable memory in response to a sequence of pulses of a number exceeding the number of memory elements.

2. The identification system according to claim 1, characterized in that the readable memory comprises a parallel-to-serial shift register formed of a connected series of flip-flops, with the preprogrammed passive memory area comprising a plurality of switches whose position determines the electronic identification code, and with each flip-flop of the moveable part shift register being associated with one of the switches corresponding to one bit of said electronic identification code, the connected series of flip-flops being grouped in several register elements each corresponding to one or more bits of said identification code.

3. The identification system according to claim 2, characterized in that the moveable part comprises a counter and a multiplexer associated therewith, said multiplexer having differing outputs which are connected to said register elements corresponding to one or more bits of said identification code, with another output of said multiplexer being connected to all of the flip-flops of the moveable part shift register in order to produce, when a signal is transmitted at said another output of said multiplexer, a simultaneous shift by one bit of the data contained in the said shift register thereby to permute the contents thereof.

4. The identification system according to claim 3, further comprising an AND gate having an output commonly connected to clock inputs of all of said flip-flops of said shift register and characterized in that the said another output of said multiplexer is connected to said AND gate.

5. The identification system according to claim 4, characterized in that the said another output of said multiplexer is also connected to inputs imposing a state on the first flip-flop of the shift register.

6. The identification system according to claim 1, characterized in that the loading electronic means of said fixed part comprises a loading circuit provided with a clock for generating clock pulses and a master-slave type double flip-flop receiving the clock pulses and supplying loading pulses and a loading modulation circuit connected to the output of said double flip-flop and provided with a counter combined with a monostable capable of acting on the loading circuit to cause it to stop after a set number of loading pulses.

7. The identification sytem according to claim 6, characterized in that said reading electronic means of the fixed part also comprises a reading circuit provided with a second master-slave type double flip-flop receiving clock pulses from said clock and connected to the output of the said monostable of the loading modulation circuit in order to trigger the transmission of successive pulses for serial reading of the data contained in the movable part shift register.

8. The identification system according to claim 1, characterized in that the reading electronic means of the fixed part also comprises a read stop circuit provided with at least one pulse counter and a second monostable linked to the output of said reading electronic means and capable of delivering a read stop pulse when the contents of the moveable part shift register have been read once.

9. The identification system according to claim 1, characterized in that the readable memory of the moveable part is looped on itself to form a multiple stage recirculating ring counter and in that the loading electronic means are designed to transmit, before the reading operation, a set number of clock pulses, which differs by a multiple from the number of bits in the said memory and which each time produces a predetermined permutation of its contents, with a first logic gate being provided in addition so as to enable the transfer of the contents of the said memory to the fixed part second memory for reading only after transmission of the said set number of pulses.

10. The identification system according to claim 9, characterized in that the moveable part comprises a second, normally open logic gate connected for receiving the successive read pulses transmitted by the fixed part reading circuit and commonly connected to the clock inputs of flip-flops comprising the stages of the moveable part shift register, and in that the read electronics means of the fixed part comprises a serial-to-parallel shift register and third logic gate connected to the input of said register in the fixed part so as to only allow the read data to be loaded into said register after the set number of clock pulses.

11. The identification system according to claim 9, characterized in that the moveable part comprises a fourth, normally open logic gate connected for receiving said set number of clock pulses transmitted by the fixed part and commonly connected to clock inputs of flip-flops comprising the stages of the moveable part shift register; control means for counting the said set number of successive clock pulses; and wherein said first logic gate is connected to the output of the movable part shift register and to the output of said control means so as to permit transfer of the contents of the moveable part register to a serial-to-parallel shift register in the fixed part only after said set number of clock pulses have been sent by said fixed part to said moveable part.

12. The identification system according to claims 10 or 11, characterized in that the fixed part comprises a read stop circuit for generating a read stop pulse when the contents of the movable part shift register have been read once, and a clock modulation circuit for counting said set number of clock pulses transmitted by the reading circuit, the said clock modulation circuit being connected to the read stop circuit so as to also enable the transmission of an additional number of read pulses equal to the number of bits comprising said identification code.

13. The identification system according to claim 12, characterized in that the clock modulation circuit and the control means comprise a set of counters associated with one or more logic gates.

14. The identification system according to claim 1, characterized in that the memory area of the movable part comprises a plurality of switches whose position determines the above-mentioned electronic identification code and in that said readable memory comprises a series of flip-flops connected to form a shift register, each flip-flop in the moveable part shift register being associated with one of the switches whose position controls its state, and further comprising two NAND gates connected to each of said flip-flops, said NAND gates receiving the loading pulses on a common one of their inputs with the first of the said gates being connected by its other input to the switch and the second gate receiving the output of the first gate on its other input.

15. The identification system according to claim 1, characterized in that said fixed part also comprises an alarm and a successive tests enabling circuit provided with a succession of flip-flops whose resetting to zero depends on the positive result of the comparison performed by the comparison means with the code preprogrammed into the fixed part, so as to enable a number of unsuccessful tests equal to the number of unsuccessful tests equal to the number of flip-flops in the said succession of flip-flops before triggering said alarm.

16. The identification system according to claim 1, in that said fixed part also comprises first timing means connected to a monostable for controlling the resetting of all the system's resettable data storage and counting elements after the moveable part has been coupled with the fixed part and before the loading pulses are transmitted.

17. The identification system according to claim 1, characterized in that said fixed part also comprises second timing means connected to a set of monostables for controlling the zero resetting of all the system's resettable data storage and counting elements and cutting off the power supply of the fixed part after the moveable part has been uncoupled from the fixed part.

18. An electronic identification system comprising an electronic receptacle installed at a fixed location and a portable electronic key adapted to be inserted into a portion of said receptacle and thereby electrically connected thereto, said electronic key comprising a preprogrammed passive memory area containing an electronic identification code and a readable memory of a series of bistable data storage elements connected to form a shift register wherein said passive memory area may be electrically connected to said elements by a loading signal and wherein at least some of said storage elements are independently controlled so as to become loaded with said electronic identification code when said key becomes connected to said receptacle and further comprising loading control means for enabling the successive loading of each independently controlled element in accordance with a predetermined set number of loading pulses of said loading signal and permutation means for altering the contents of said storage elements in the event that the pulses of said loading signal exceed said predetermined set number and thereby preventing a valid identification code to be read serially from said shift register by said receptacle, said electronic receptacle comprising:

initialization means for initializing said system when said key becomes electrically connected to said receptacle, clock pulse generation means responsive to said initialization means for generating and putting out to said key at least two clock pulse groups including an initial load group of said set number of loading pulses and a read group of reading pulses during a subsequent read interval, electronic memory means connected to receive as serial bits and store in parallel a code word read from said shift register of said key during a said read interval, preprogrammed array means for providing a bit pattern predetermined to correspond to a valid code word stored in said electronic memory during said read interval, comparator means connected to said electronic memory means after said code word has been stored therein and to said preprogrammed array means for determining equivalence or non equivalence between said stored code word and said valid code word, and system identification confirmation output means connected to said comparator means and responsive to the determination of equivalence by said comparator means.

* * * * *